United States Patent
Vyas et al.

(10) Patent No.: US 10,117,171 B2
(45) Date of Patent: Oct. 30, 2018

(54) ESTIMATING INTERVALS AT WHICH TO TRANSMIT KEEP-ALIVE MESSAGES FROM A WIRELESS STATION TO AN ACCESS POINT

(71) Applicant: GainSpan Corporation, San Jose, CA (US)

(72) Inventors: Pankaj Vyas, Bangalore (IN); Vishal Batra, Bangalore (IN)

(73) Assignee: GainSpan Corporation, San Jose, CA (US)

( * ) Notice: Subject to any disclaimer, the term of this patent is extended or adjusted under 35 U.S.C. 154(b) by 111 days.

(21) Appl. No.: 15/153,756

(22) Filed: May 13, 2016

(65) Prior Publication Data
US 2017/0332318 A1 Nov. 16, 2017

(51) Int. Cl.
| | | |
|---|---|---|
| H04W 48/20 | (2009.01) | |
| H04W 48/10 | (2009.01) | |
| H04W 76/19 | (2018.01) | |
| H04W 76/38 | (2018.01) | |
| H04W 84/12 | (2009.01) | |

(52) U.S. Cl.
CPC ........... *H04W 48/20* (2013.01); *H04W 48/10* (2013.01); *H04W 76/19* (2018.02); *H04W 76/38* (2018.02); *H04W 84/12* (2013.01)

(58) Field of Classification Search
None
See application file for complete search history.

(56) References Cited

U.S. PATENT DOCUMENTS

| | | |
|---|---|---|
| 7,957,742 B2 | 6/2011 | Kostic et al. |
| 2007/0297438 A1 | 12/2007 | Meylan et al. |
| 2008/0123577 A1* | 5/2008 | Jaakkola ........... H04W 52/0225 370/311 |
| 2010/0325306 A1 | 12/2010 | Vimpari et al. |
| 2012/0147800 A1 | 6/2012 | Park et al. |
| 2013/0286909 A1 | 10/2013 | Panneerselvam et al. |
| 2014/0169338 A1 | 6/2014 | Bajko |
| 2015/0043566 A1 | 2/2015 | Wu et al. |
| 2015/0055641 A1 | 2/2015 | Pantelidou et al. |
| 2016/0286590 A1* | 9/2016 | Cheng ................. H04W 76/023 |

OTHER PUBLICATIONS 802.11r, 802.11k, 802.11v, 802.11w Fast Transition Roaming, http://www.cisco.com/c/en/us/td/docs/wireless/controller/8-1/Enterprise-Mobility-8-1-Design-Guide/Enterprise_Mobility_8_1_Deployment_Guide/Chapter-11.pdf, Enterprise Mobility 8.1 Design Guide, Chapter 11, downloaded circa Mar. 31, 2016, pp. 1-28.

(Continued)

*Primary Examiner* — Alex Skripnikov
(74) *Attorney, Agent, or Firm* — Pearl Cohen Zedek Latzer Baratz LLP

(57) ABSTRACT

A wireless station (STA) of a wireless network operates to estimate intervals at which to transmit keep-alive messages to an access point (AP) with which the STA is associated. The STA receives a de-authentication frame from the AP. The de-authentication frame indicates that the AP has disassociated the STA due to inactivity. The STA determines a keep-alive interval based on one or more de-authenticated messages, including the de-authentication frame. The STA transmits keep-alive messages according to the determined keep-alive interval.

17 Claims, 7 Drawing Sheets

(56) References Cited

OTHER PUBLICATIONS

Receive the De-authenticating reason Inactivity access point log message, https://supportforums.cisco.com/document/21196/receive-deauthenticating-ciscouser000xxxxxxaxb-reason-inactivity-access-point-log, Cisco Support Community, Mar. 31, 2016, pp. 1-9.
Part 11: Wireless LAN Medium Access Control (MAC) and Physical Layer (PHY) Specifications, http://www.google.co.in/url?url=http://ieeexplore.ieee.org/iel5/6642/17714/00817038.pdf&rct=j&frm=1&q=&esrc=s&sa=U&ved=0ahUKEwiGx7XrjvzMAhXFNo8KHUKzBckQFggfMAI&usg=AFQjCNERWbA0x1yTyre-aNSkuvTyjyFvjQ, IEEE Computer Society, Mar. 29, 2012, pp. 1-2793.

* cited by examiner

ESTIMATING INTERVALS AT WHICH TO TRANSMIT KEEP-ALIVE MESSAGES FROM A WIRELESS STATION TO AN ACCESS POINT

BACKGROUND

Technical Field

Embodiments of the present disclosure relate generally to wireless networks, and more specifically to estimating intervals at which to transmit keep-alive messages from a wireless station to an access point.

Related Art

A Wireless Local Area Network (WLAN) generally refers to a network in which wireless end devices communicate with each other over a short distance (typically of the order of tens of meters) using wireless medium. A WLAN may be designed to contain an access point (AP), and one or more wireless stations (STA, which operate as end devices). The AP operates to receive a wireless frame from one STA and forward the received wireless frame to another (target) STA, or to a switch which is in the path to the target STA. STAs of a WLAN can also communicate with other systems/devices (wired or wireless) outside of the WLAN via the AP.

APs require STAs to go through a process of 'association' before an AP serves the corresponding STA in terms of receiving frames from the STA or sending frames to the STA. APs accordingly maintain internal data indicating the specific STAs which are associated with that AP.

APs are often designed to disassociate inactive wireless stations. A wireless station is deemed to be inactive if no frame is received at the AP from the wireless station for a predetermined duration, referred to as inactivity time. Disassociation implies that the AP will thereafter not forward frames from/to the corresponding (disassociated) wireless station until that wireless station re-associates with the AP according to the conventions prescribed by the WLAN protocol(s).

Keep-alive messages are a mechanism to avoid such disassociation. In a typical scenario, a wireless station proactively transmits keep-alive messages before expiry of the inactivity time (at least when no data frames are transmitted in the corresponding prior duration). A keep-alive message is generally a NULL frame (implying no valid data in the payload), though the message can contain any data elements that can be conveniently included in (the payload or header of) the message.

It is often desirable that a wireless station have at least a reasonably accurate estimate of the inactivity time. A higher value than that used by the AP can cause disassociation, thereby requiring re-association. A lower value on the other hand leads to unneeded transmissions from the wireless stations to the APs, and therefore additional power consumption. Such overheads are of particular concern in IoT (Internet of Things) type environments in view of the large number of wireless stations a WLAN is expected to contain.

Aspects of the present disclosure are related to estimating such intervals in WLAN environments.

BRIEF DESCRIPTION OF THE VIEWS OF DRAWINGS

Example embodiments of the present disclosure will be described with reference to the accompanying drawings briefly described below.

The drawing in which an element first appears is indicated by the leftmost digit(s) in the corresponding reference number.

DETAILED DESCRIPTION

1. Overview

A wireless station (STA) of a wireless network operates to estimate intervals at which to transmit keep-alive messages to an access point (AP) with which the STA is associated. The STA receives a de-authentication frame from the AP. The de-authentication frame indicates that the AP has disassociated the STA due to inactivity. The STA determines a keep-alive interval based on one or more de-authenticated messages, including the de-authentication frame. The STA transmits keep-alive messages according to the determined keep-alive interval.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
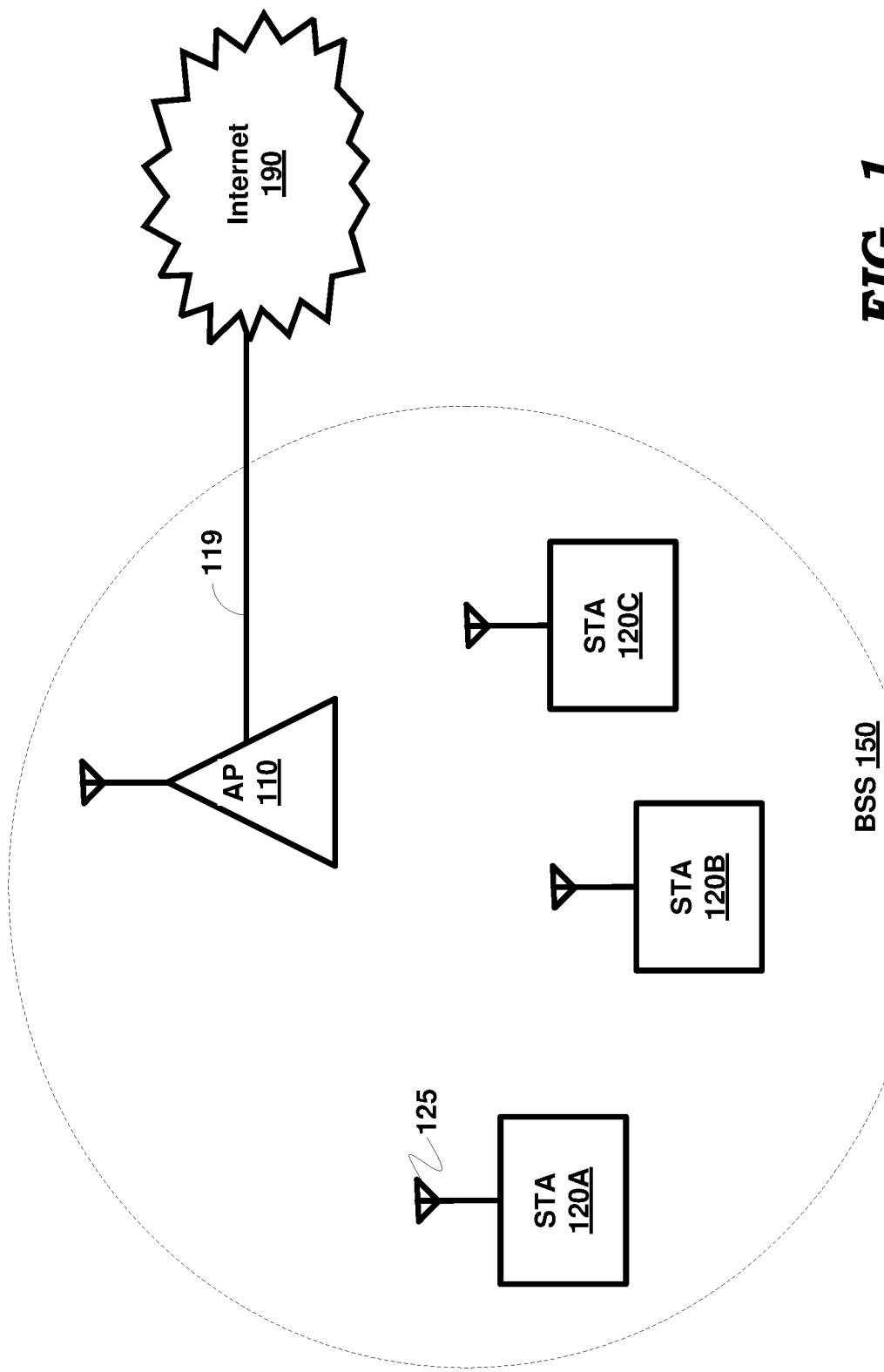
FIG. 1 is a block diagram representing an example environment in which several aspects of the present disclosure can be implemented.

FIG. 1 is a block diagram representing an example environment in which several aspects of the present disclosure can be implemented. The example environment is shown containing only representative devices and systems for illustration. However, real world environments may contain more or fewer systems/devices. FIG. 1 is shown containing access point (AP) 110, wireless stations (STA) 120A, 120B and 120C, and internet 190.

Internet 190 extends the connectivity of devices (STA 120A, STA 120B and STA 120C) in BSS 150 to various systems (not shown) connected to, or part of, internet 190. Internet 190 is shown connected to AP 110 through a wired path 119. Internet 190 may be implemented using protocols such as IP. In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across WLANs.

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

Each of STAs 120A, 120B and 120C represents an end device that may execute various user applications. STAs 120A, 120B and 120C may communicate with each other via AP 110. Further one or more STAs 120A, 120B and 120C may communicate with devices in internet 190 also via AP 110. In an embodiment, AP 110, and STAs 120A, 120B and 120C form a basic service set (BSS) 150 consistent with IEEE 802.11 family of standards. The antenna of STA 120A is shown numbered as 125. While the components and devices of FIG. 1 are noted as being designed to operate according to IEEE 802.11 family of standards, in other embodiments, the components and devices of FIG. 1 may be designed to operate consistent with other similar wireless standards.

The user applications in one or more of STAs 120A-120C may generate data values, which may then be transmitted by the STAs to another one of STAs 120A-120C or a device/system in internet 190 (via AP 110). For example, each of STAs 120A-120C may internally contain one or more sensors, which collect corresponding parameter values such as temperature and pressure in process control systems. The STAs may transmit the sensed values in the corresponding data frames. The interval between a pair of successive transmissions from a STA may differ from STA to STA, and may also be unpredictable (being dependent on the nature of the applications executing in the STAs). However, as noted above, the STA may first need to associate with an AP and continue in the associated state for the STA to be able to send frames via the AP (and also receive frames from the AP). The association is performed, for example, as described in ** section of IEEE 802.11 standards.

As also noted above, AP 110 may be implemented to disassociate inactive (and previously associated) wireless stations. Thus, if no transmission is received from STA 120A within the elapse of a predetermined duration (inactivity time, noted above) from the time instant of the previous/last transmission from STA 120A, AP 110 may be designed to disassociate STA 120A. AP 110 may similarly disassociate other STA 120B and/or 120C if no transmissions are received from them within the inactivity time (as represented by the time interval between a corresponding pair of successive transmissions of data/control frames, etc). AP 110 may maintain one or more timers locally to signal the elapse of inactivity time with respect to each of the associated STAs (STAs 120A-120C in FIG. 1). Typically, AP 110 operates to disassociate inactive STAs to conserve or minimize memory required to maintain data structures or other information related to active (associated) STAs.

Once disassociated, a STA may need to re-associate with AP 110 if it needs to operate again as part of BSS 150. Such re-association may translate to unnecessary power consumption in the re-associating STA, congestion in the wireless network, and may also reduce the availability/throughput of the STA.

As noted above, keep-alive messages are a mechanism to avoid disassociation due to inactivity. However, as also noted above, the intervals at which a STA transmits keep-alive messages may need to be as close as possible to the inactivity time maintained at the AP. In one prior approach, an AP communicates the inactivity time to one or more of the associated STAs at the time of association with the respective STA. However, in several environments, the AP may not be designed to communicate the inactivity time to STAs. With respect to FIG. 1 for example, the STAs may be designed by one vendor, and AP 110 may be designed by another vendor. At least in such environments where the inactivity time is not available to STAs, there is a need for the STAs 120A-120C to estimate the inactivity time maintained by AP 110, as described next with respect to examples.

3. Operations in a Wireless Station

Figure 2:
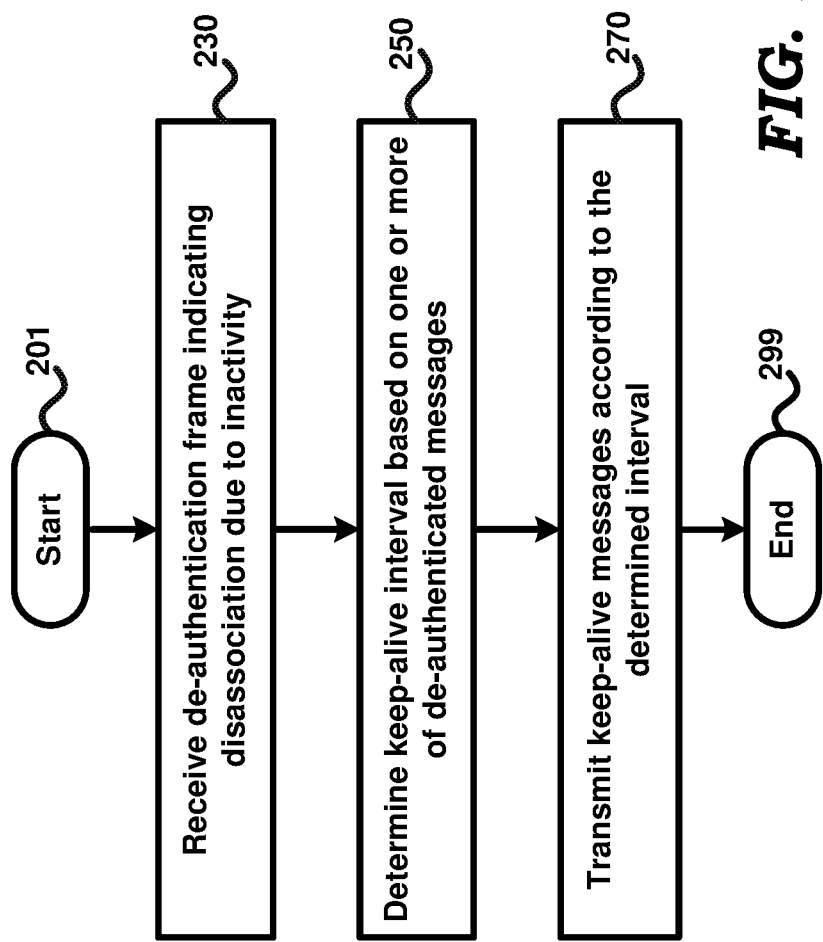
FIG. 2 is a flowchart illustrating operations in a STA for estimation of intervals at which to transmit keep-alive messages, in an embodiment of the present disclosure.

FIG. 2 is a flowchart illustrating operations in a wireless station for estimation of intervals at which to transmit keep-alive messages, in an embodiment. The flowchart is described with respect to the environment of FIG. 1, and in relation to wireless device 120A, merely for illustration. However, various features described herein can be implemented in other environments and using other components as well, as will be apparent to one skilled in the relevant arts by reading the disclosure provided herein. Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 201, in which control passes immediately to step 230.

In step 230, STA 120A receives a de-authentication frame indicating disassociation due to inactivity. Disassociation due to inactivity indicates that AP 110 has de-authenticated/de-associated STA 120A since no transmissions (frames) were received by AP 110 within an interval equal to the inactivity time from the last transmission received from STA 120A by AP 110. Control then passes to step 250.

In step 250, STA 120A determines a keep-alive interval based on one or more de-authenticated messages. The keep-alive interval represents a maximum time interval between successive transmissions (data frames/control frames or keep-alive messages) from STA 120A to (or via) AP 110, to ensure that AP 110 does not disassociate STA 120A. Control then passes to step 270.

In step 270, STA 120A transmits keep-alive messages according to the determined keep-alive interval. Control then passes to step 299, in which the flowchart ends.

Thus, the STA 120A estimates the value of inactivity time based on receipt of one or more de-authentication frames. As described below with additional representative example, the estimation may be performed in conjunction with other additional operations. The operation of the steps of the flowchart of FIG. 2 is illustrated next with respect to example embodiments.

4. Estimating Keep-Alive Intervals

Figure 3:
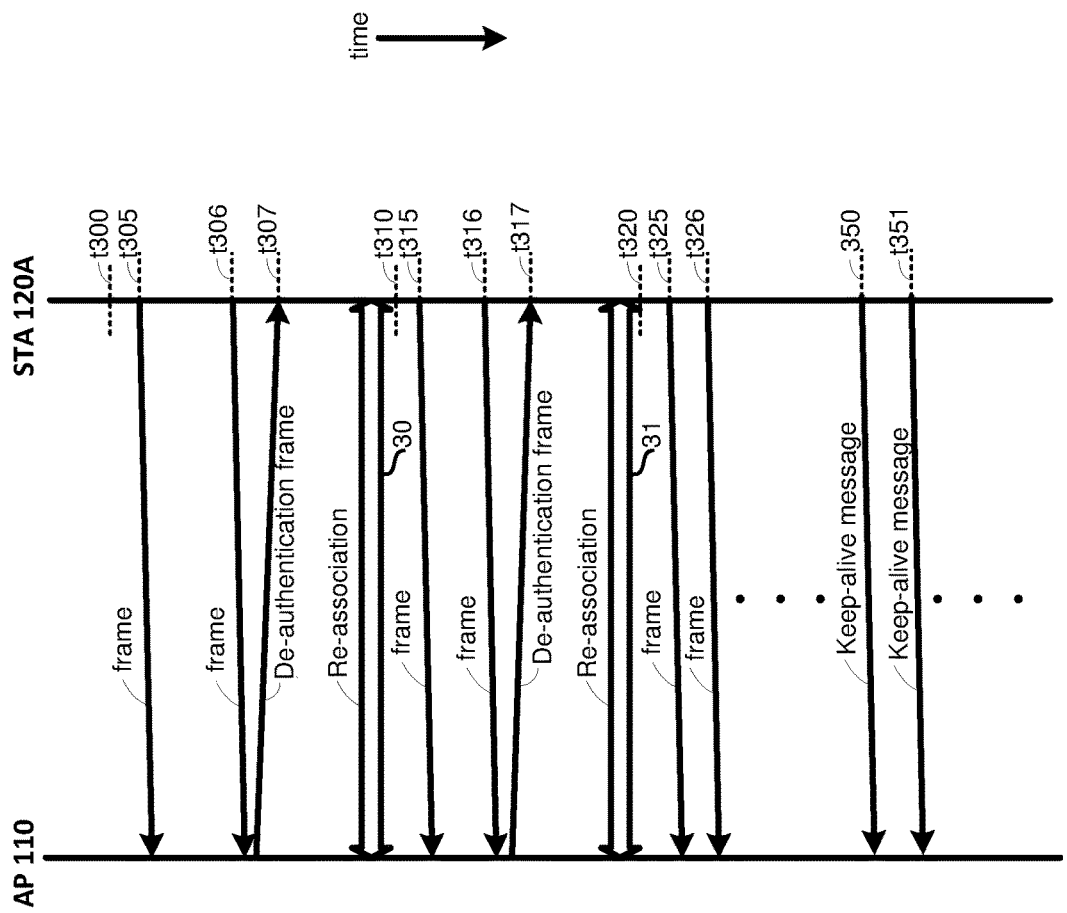
FIG. 3 is a diagram illustrating the manner in which a STA estimates the value of keep-alive intervals, in an embodiment of the present disclosure.

FIG. 3 is a diagram illustrating the manner in which a STA estimates the value of keep-alive intervals, in an embodiment of the present disclosure. FIG. 3 shows the exchange of various frames/messages between AP 110 and STA 120A. In the embodiment described with respect to FIG. 3, it is assumed that a keep-alive module independent of the application layer in STA 120A performs the operations of maintaining and adjusting the value of the expected inactivity time (as noted below). The keep-alive module does not have control on, or a priori knowledge of, when the application layer of STA 120A generates frames (data, management or control). The keep-alive module may communicate with one or both of network layer and the data-link layer of STA 120A to allow the operations of maintaining and adjusting noted above. The keep-alive module and the communication layers in STA 120A are shown and described in greater detail with respect to FIG. 4.

The keep-alive module records the time instants at which the frames generated by the application layer reach layer-3. It is assumed that the delays incurred by a frame in traversing from the application layer, through intermediate layers, and onto the wireless transmission medium of STA 120A are negligible. Thus, it is assumed that the time of generation of a frame is the same as the time the frame is sent on the wireless transmission medium.

It is assumed in FIG. 3 that STA 120A has completed operations required for association and authentication (i.e., has associated and authenticated) with AP 110 at or a short duration prior to time instant t300. Also, it is assumed that the inactivity time maintained/used by AP 110 is ten minutes.

At t300, the keep-alive module initializes the value of the expected inactivity time (e.g., in a local memory) in STA 120A. The expected inactivity time represents an estimate made by STA 120A of the inactivity time used by AP 110. As an example, it is assumed that the initialized value of the estimated inactivity time is thirty minutes. The application layer of STA 120A generates a frame at t305 with destination as AP 110, and the keep-alive module records the time of transmission (also assumed to be t305) of the frame. It is assumed that the time difference between t305 and t300 is less than the inactivity time maintained by AP 110. The application layer generates a next frame at t306 with destination as AP 110 (step 210), and the keep-alive module records the time of transmission (t306) of the frame. It is assumed that time difference between instants t306 and t305 is twenty minutes, as an example.

Since the time difference between t306 and t305 is greater than the inactivity time used by AP 110 (assumed to be ten minutes as noted above), AP 110 issues a de-authentication frame to STA 120A (step 230). The de-authentication frame is shown as being received at t307 by STA 120A. It is noted here that, in general, AP 110 would send a de-authentication frame when it removes a STA (for example, due to inactivity) from its list of active STAs. AP 110 would also send a de-authentication frame in response to a frame received from a STA that is not present in its active STA list. In the example of FIG. 3, it is assumed that the de-authentication frame of t307 is in response to the frame transmitted at t306.

In an alternative embodiment, AP 110 sends (for example, sometime between t305 and t306) a de-authentication frame when it removes STA 120A from the list of active STAs. Upon receipt of the de-authentication frame, STA 120A computes the time difference between the time of receipt of the de-authentication frame and t305 (the time at which the last frame was sent to AP 110 from STA 120A), and sets the final value of the expected inactivity time as the time difference between the time of receipt of the de-authentication frame and the time (t305) at which the last frame was sent to AP 110. In such instances, the final value of the expected inactivity time thus computed would be a fairly accurate estimate of the inactivity time used by AP 110, and STA 120A uses the final value as a basis to send keep-alive messages in the future.

In yet another embodiment, in which if STA 120A does not send any frames to AP 110 even after the expiry of the inactivity time as measured from the end of association procedures (t300), and AP 110 sends a de-authentication frame to STA 120, then STA 120A sets the final value of the expected inactivity time to the time difference between the end of association and receipt of the de-authentication frame. STA 120A then uses the final value as a basis to send keep-alive messages in the future.

Continuing with the description of FIG. 3, in response to the receipt of the de-authentication frame at t307, keep-alive module of STA 120A computes the time difference between instants t306 and t305, and determines that the time difference is less than the expected inactivity time initialized at t300. Hence, keep-alive module of STA 120A updates (sets) the expected inactivity time to the time difference, i.e., twenty minutes. STA 120A (via the MAC layer in the data-link layer of STA 120A) then re-associates with AP 110, as indicated by the bold arrow numbered 30 in FIG. 3. The re-association may be performed in a known way. At the end of re-association at t310, the expected inactivity time is (initialized to) twenty minutes.

The application layer of STA 120A is shown as generating another frame at t315 with destination as AP 110, and keep-alive module records the time of transmission (also assumed to be t315) of the frame. Again, it is assumed that the time difference between t315 and t310 is less than the inactivity time maintained by AP 110. The application layer of STA 120A generates a next frame at t316 with destination as AP 110 (step 210), and keep-alive module records the time of transmission (t316) of the frame. It is assumed that time difference between instants t316 and t315 is fifteen minutes, as an example.

Since the time difference between t316 and t315 is greater than the inactivity time used by AP 110, AP 110 issues another de-authentication frame to STA 120A (step 230). The de-authentication frame is shown as being received at t317 by STA 120A.

In response to the receipt of the de-authentication frame at t317, keep-alive module of STA 120A computes the time difference between instants t316 and t315, and determines that the time difference is less than the current value of the expected inactivity time. Hence, keep-alive module of STA 120A updates (sets) the expected inactivity time to the time difference, i.e., fifteen minutes. STA 120A then re-associates with AP 110, as indicated by the bold arrow numbered 31 in FIG. 3. At the end of re-association at t320, the expected inactivity time is fifteen minutes.

The application layer of STA 120A is shown as generating another pair of successive frames at t325 and t326, each with destination as AP 110, and keep-alive module records the respective transmission instants. It is assumed that the time difference between instants t325 and t326 is less than the inactivity time used by AP 110. Therefore, AP 110 does not issue a de-authentication frame, and keep-alive module of STA 120A does not update the expected inactivity time, which is retained at fifteen minutes.

In an alternative embodiment, however, on non-receipt of any de-authentication frame, keep-alive module of STA 120A increases the value of the expected inactivity time by a predetermined value, for example, five minutes. It is noted here that the typical time delay from receipt of a frame by AP 110, and transmission of a corresponding de-authentication frame by the AP 110 (assuming the frame was received after expiry of the inactivity time by AP 110) is of the order of a few milliseconds. Thus, STA 120A may wait for typical time delay to expire before increasing the value of the expected inactivity time as noted above, wherein it is assumed that the time taken for a frame to travel through the wireless medium between AP 110 and STA 120A is negligible.

The frame exchanges between AP 110 and STA 120A may repeat, and keep-alive module of STA 120A may update the value of the expected inactivity time until a stop (or convergence) criterion is reached. As noted in the previous paragraphs, STA 120A reduces the expected inactivity time towards a 'lower-value' every time a de-authentication frame is received from AP 110. If no de-authentication frame is received from AP 110, STA 120A increases the expected inactivity time towards a 'higher value'. One example of convergence is when the difference between the 'higher value' and the 'lower value' is less than some predetermined threshold, for example, one minute. When such convergence is reached, STA 120A uses the lower value as the final value of the expected inactivity time.

Keep-alive module of STA 120A then uses the final value of the expected inactivity time upon reaching convergence as the best estimate (step 250) of the inactivity time used by AP 110. Thereafter, keep-alive module of STA 120A transmits keep-alive messages (step 270) at the end of intervals equal to the final value of the expected inactivity time. In FIG. 3, STA 120A is shown as transmitting keep-alive messages at t350 and t351, wherein it is assumed that convergence has occurred sometime prior to t350. The time interval t350-t351 is equal to the final value of the expected inactivity time.

Although both the transmissions at t350 and t351 are noted in FIG. 3 as keep-alive messages, the transmission at t350 could instead be a frame generated by the application layer of STA 120. In general, keep-alive module of STA 120A ensures that there are at least two transmissions (data/control frames or keep-alive messages) to AP 110 in every interval equal to the final expected inactivity time. In an embodiment, a keep-alive message is a NULL frame (which is also a control frame according to IEEE 802.11). In another embodiment, a Gratuitous ARP (Address Resolution Protocol) is used as a keep-alive message.

Figure 4:
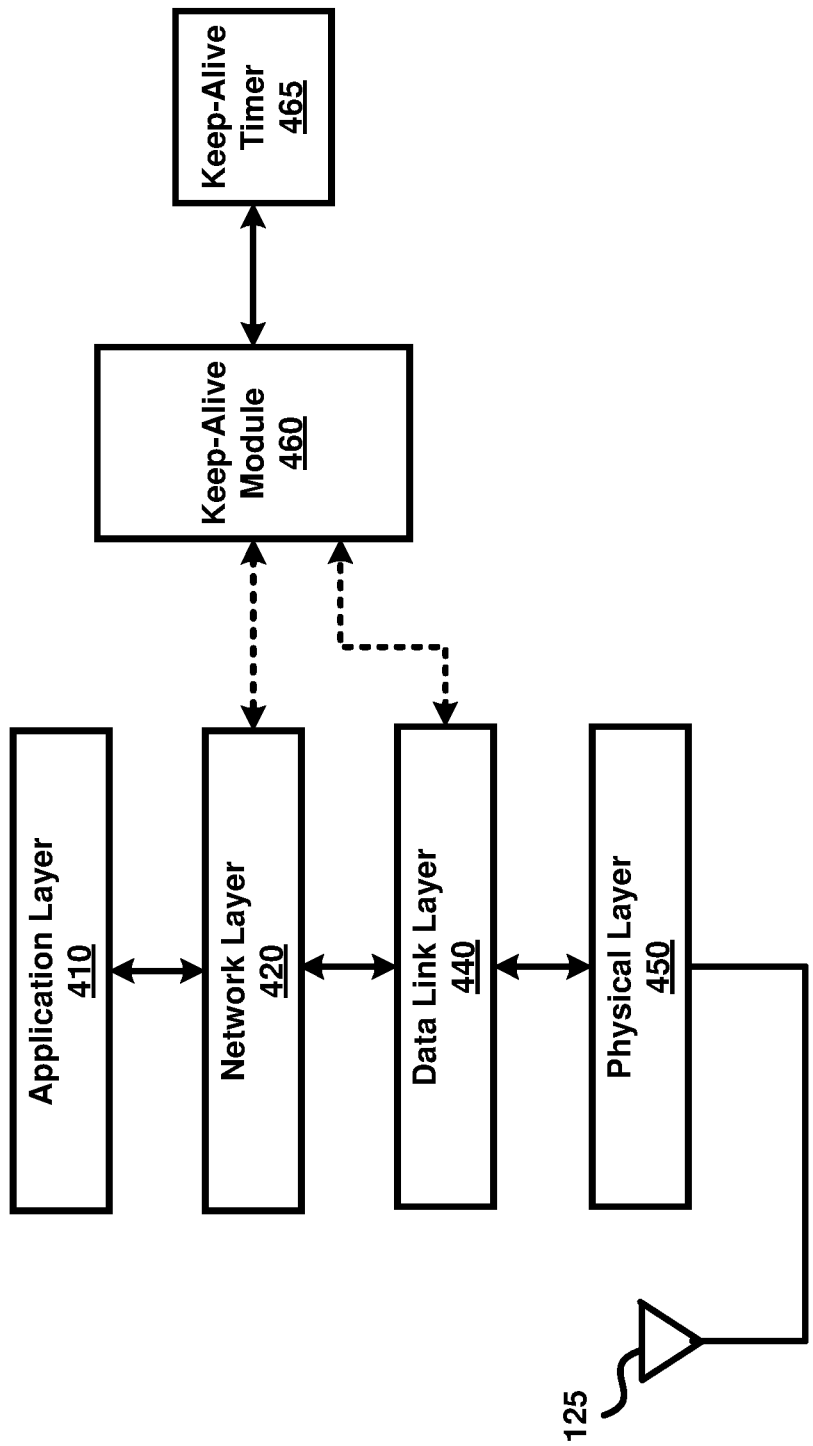
FIG. 4 is a block diagram illustrating the various communication layers operating in a STA, as well as a keep-alive module, in an embodiment of the present disclosure.

Keep-alive module of STA 120A may maintain one or more timers locally to signal the elapse of the final expected inactivity time. FIG. 4 is a block diagram showing the keep-alive module of above and the various communication layers (protocol stack) in STA 120A, and which are operative in sending/receiving of frames/messages. STAs 120B and 120C would also have similar or identical communication layers.

Application layer 410, network layer 420, data link layer 440 and physical layer 450 of FIG. 4 may be implemented to generally conform to the ISO OSI (International Standards Organization Open Systems Interconnect) model, and are only briefly described below, since the corresponding implementations of the blocks would be well known to one skilled in the relevant arts on reading the disclosure herein. Further, only the relevant blocks of the protocol stack are shown in FIG. 4, and typically more blocks (such as transport layer etc.) according to the ISO OSI model may be present, as also would be apparent to one skilled in the relevant arts.

Physical layer 450 represents the electrical and physical interface between STA 120A and a wireless transmission medium. Physical layer 450 receives data from data link layer 440 and forwards the data to antenna 125 for transmission. Physical layer 450 receives data from antenna 125 and forwards the data to data link layer 440.

Data link layer 440, operates to provide a reliable data link between STA 120A and other nodes such as AP 110, and may perform medium access control (MAC) as well as error checking operations. In addition, data link layer 440 may operate to encapsulate an IP packet received from network layer 420 in a MAC frame, and forward the MAC frame to physical layer 450. In the other direction, data link layer 440 receives MAC frames from physical layer 450, and forwards the payload portion of the MAC frame (which is an IP packet) to network layer 420. Physical layer 450 and data link layer 440 may be designed to conform to the IEEE 802.11 family of specifications, and can be implemented in a known way in accordance with the description provided herein.

Network layer 420 enables STA 120A to transmit and receive layer-3 (Internet Protocol) packets. Network layer may form an IP packet with payload/data received from application layer 410 and destination and source IP addresses, and forwards the IP packet to data link layer 440. Network layer 420 receives an IP packet from data link layer 440, determines if STA 120A is the destination for the packet, and forwards the payload portion of the IP packet to application layer 410

Application layer 410 represents a communications component that allows software applications executing in STA 120A to communicate with software applications in other nodes (e.g., those of FIG. 1) via the other blocks shown in FIG. 4. Application layer 410 generates frames for transmission to (or via) AP 110, and receives frames from other nodes (including AP 110) for appropriate processing. The transmitted frames may contain data elements generated locally at the STA 120A, for example, by local sensors (not shown).

Keep-alive module 460 performs the operations performed by the keep-alive module noted above, and programs keep alive-timer 465 with the final expected inactivity time. Upon expiry of keep alive-timer 465, keep-alive module 460 transmits a keep-alive message to AP 110 (assuming no other frame/message has been transmitted to AP 110 since the transmission of the previous frame). Keep-alive module 460 repeatedly re-initializes keep-alive timer 465 again with the final expected inactivity time, and transmits corresponding keep-alive messages to AP 110 to prevent disassociation of STA 120A from AP 110. Keep alive-module 460 interacts with one or both of network layer 420 and data-link layer 440 to perform the operations noted above with respect to keep-alive module. For example, keep-alive module 460 may receive from network layer 420 (or alternatively from data link layer 440) indication of receipt of a frame to be transmitted by STA 120A to AP 110, or receipt of a de-authentication frame from AP 110.

In an another embodiment of the present disclosure, the operations performed by keep-alive module 460 (as noted above) are instead performed by application layer 420 itself, and the description is continued with respect to such an embodiment.

5. Other Embodiments

Figure 5:
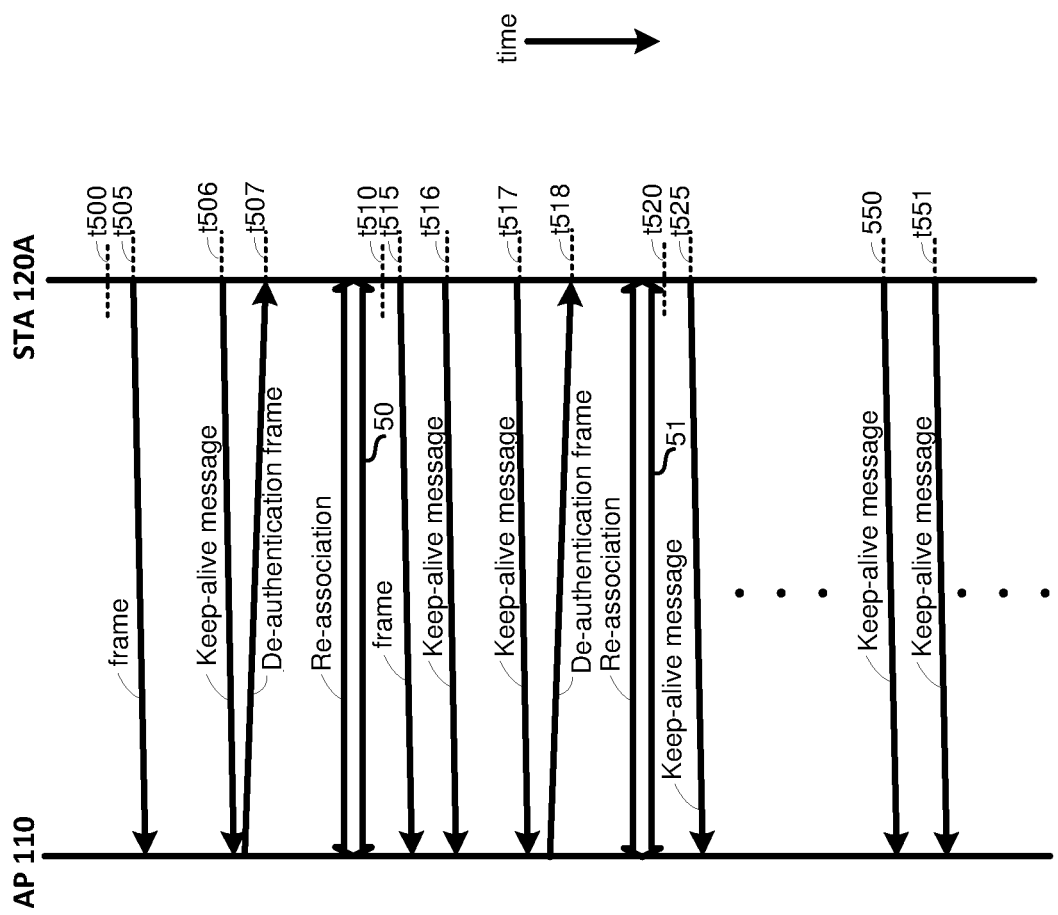
FIG. 5 is a diagram illustrating the manner in which a STA estimates the value of keep-alive intervals, in another embodiment of the present disclosure.

In another embodiment of the present disclosure, application layer 410 operates keep alive-timer 465 directly, or via keep-alive module 460 (although not indicated in FIG. 4 in the interest of clarity), in estimating the value of the inactivity time. Thereafter, keep-alive module 460 transmits keep-alive messages based on expiry of keep-alive timer 465. FIG. 5 illustrates example frame exchanges between AP 110 and STA 120A according to the embodiment. It is assumed in FIG. 4 that STA 120A has completed operations required for association and authentication (i.e., has associated and authenticated) with AP 110 at or a short duration prior to time instant t500. Also, it is assumed that the inactivity time maintained/used by AP 110 is ten minutes. It is assumed with respect to FIG. 5 that the delays incurred by a frame/keep-alive message in traversing from the application layer, through intermediate layers, and onto the wireless transmission medium of STA 120A are negligible. Thus, it is assumed that the time of generation of a frame/keep-alive message is the same as the time the frame/keep-alive message is transmitted on the wireless transmission medium.

At t500, application layer 410 initializes keep-alive timer 465 (or alternatively instructs keep-alive module 460 to do so) with an initial value of the expected inactivity time. As in the description above, the expected inactivity time represents an estimate made by STA 120A of the inactivity time used by AP 110. As an example, it is assumed that the initialized value of the estimated inactivity time is fifteen minutes. At t500, keep-alive timer 465 starts to count down to zero from the initialized value.

Application layer 410 generates a frame for transmission to AP 110 at t505. STA 120A is assumed to transmit the frame also at t505. The time difference between t500 and t505 is assumed to be less than fifteen minutes. At t505, application layer 410 re-initializes keep-alive timer 465 to 15 minutes, and keep-alive timer 465 again starts to count down to zero at t505.

Keep-alive timer 465 reaches a count of zero at the end of fifteen minutes, at t506, and triggers (for example, by way of an interrupt) application layer 410 (or keep-alive module 460 upon command from application layer 410) to transmit (via the other layers of FIG. 4) a keep-alive message to AP 110 at t506. It is noted, however, that instead of a keep-alive message, if a frame (data/control or management) had been generated and available for transmitting to AP 110, application layer 410 may instead transmit the frame at t506.

Since the keep-alive message of t506 was received later (from t505) then the inactivity time of AP 110, AP 110 transmits a de-authentication frame to STA 120A. The de-authentication frame is shown as being received at t507 by STA 120A.

In response to the receipt of the de-authentication frame at t507, application layer 410 initiates a re-association, and MAC (medium access control portion of data link layer 440 performs the re-association with AP 110. The re-association of STA 120A with AP 110 is indicated by the bold line 50 in FIG. 5. Shortly after re-association is completed, at t510, application layer 420 re-initializes keep-alive timer 465 with half the value (or in general as smaller value according to some convention) used to initialize the timer at t505. Thus, application layer 410 re-initializes keep-alive timer 465 with a value of 7.5 minutes.

Application layer 410 transmits a frame to AP 110 at t515. The time difference between t510 and t515 is assumed to be less than 7.5 minutes. At t515, application layer 410 re-initializes keep-alive timer 465 to 7.5 minutes, and keep-alive timer 465 again starts to count down to zero at t515.

Keep-alive timer 465 reaches a count of zero at the end of 7.5 minutes, at t516, and triggers application layer 410 (or keep-alive module 460) to transmit a keep-alive message to AP 110 at t516. Again it is noted, however, that instead of a keep-alive message, if a frame (data/control or management) had been generated and available for transmitting to AP 110, application layer 410 may instead transmit the frame at t516.

Since the keep-alive message of t516 was received earlier than elapse of the inactivity time of AP 110 as measured from t515, AP 110 does not transmit a de-authentication frame. Therefore, application layer 410 re-initializes (shortly, for example a few milliseconds, after t516) keep-alive timer 465 to the value mid-way between 7.5 minutes and 15 minutes, i.e., 11.25 minutes. In general, in the absence of a de-authentication frame from AP 110 in response to a frame/keep-alive message, application layer 410 increases the expected inactivity time according to some convention. Application layer 410 transmits a next frame to AP 110 at t517, after expiry of 11.25 minutes from t516.

Since the keep-alive message of t506 is received later (from t516) then the inactivity time of AP 110, AP 110 transmits a de-authentication frame STA 120A. The de-authentication frame is shown as being received at t518 by STA 120A.

In response to the receipt of the de-authentication frame at t507, application layer 410 operates (in conjunction with the MAC layer, as noted above) to re-associate STA 120A with AP 110, as indicated by the bold line 51 in FIG. 5. Shortly after re-association is completed, at t520, application layer 410 re-initializes keep-alive timer 465 to the value mid-way between 7.5 minutes and 11.25 minutes, i.e., 9.375 minutes. STA 120A transmits a next keep-alive message at t525, at the expiry of the keep-alive timer (it is assumed that application layer 120A does not generate a frame in the meantime.

It may be observed that application layer 410 adjusts the expected inactivity time in a binary successive-approximation manner (example search approach). However, other 'search' approaches can also be used, as would be apparent to one skilled in the relevant arts by reading the disclosure herein.

The frame exchanges between AP 110 and STA 120A and the adjustment of the expected inactivity time may repeat until a stop (or convergence) criterion is reached (e.g., until the difference between the expected inactivity time and the inactivity time as used by AP 110 is found to be less than a threshold value). The threshold difference can be decided by application layer 410, and can be for example, one minute. Application of STA 120A then uses the value of the expected inactivity time upon reaching convergence as the best estimate (step 250) of the inactivity time used by AP 110. Thereafter, keep-alive module 460 transmits keep-alive messages (step 270) at the end of intervals equal to the final value of the expected inactivity time. In FIG. 5, STA 120A is shown as transmitting keep-alive messages at t550 and t551, wherein it is assumed that convergence has occurred sometime prior to t550. The time interval t550-t551 is equal to the final value of the expected inactivity time.

6. Receiving the Inactivity Time Directly from AP

Figure 6:
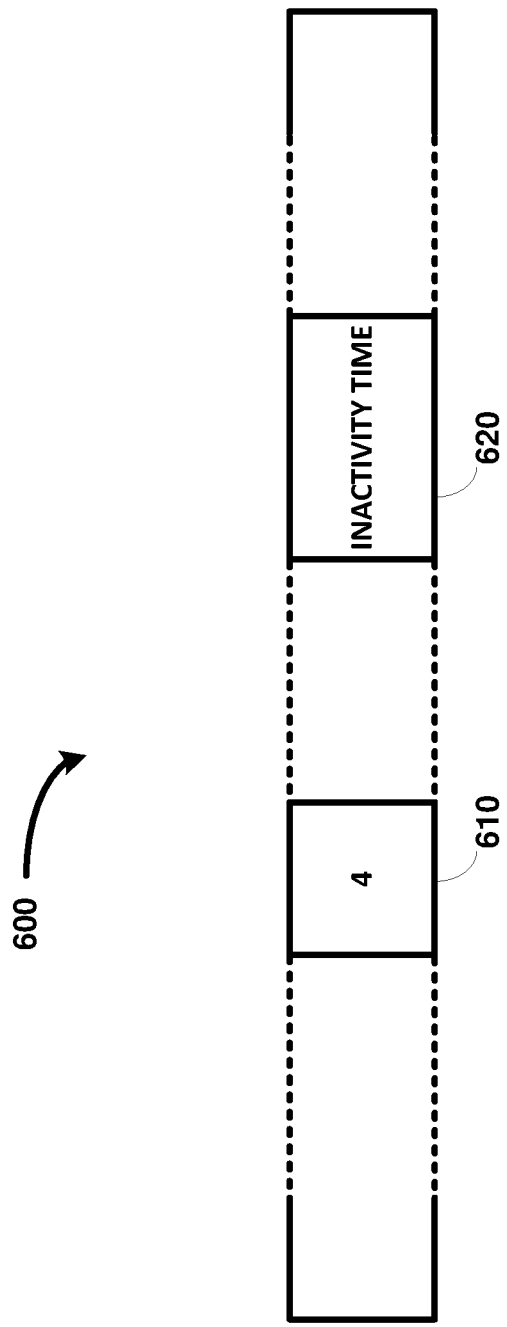
FIG. 6 is a diagram showing relevant fields of a de-authentication frame transmitted by an AP.

In yet another embodiment of the present disclosure, AP 110 transmits the inactivity time used by it to the corresponding STA in a de-authentication frame transmitted to the STA in response to non-receipt at AP 110 of frames within the inactivity time. FIG. 6 shows such a de-authentication frame 600. Field 610 represents the Reason Code field described in section 8.4.1.7 of IEEE Std 802.11™-2012 document, and Table 8.36 of that document specifies the possible values of the reason code. A value of 4 is shown in field 610 indicating that the reason is 'Disassociated due to inactivity', as also noted in table 8.36.

Field 620 represents an information element (IE) field, and contains the inactivity time used by AP 110. After re-association with AP 110, the previously disassociated STA transmits keep-alive messages before elapse of the inactivity time from the last transmission (which could be a frame or another keep-alive message), thereby ensuring that the STA does not get disassociated by AP 110.

By operating as described above to estimate the inactivity time of AP 110, and by transmitting keep-alive messages accordingly, STAs associate with AP 110 can ensure that they do not get disassociated (at least after convergence of the estimation process as noted above) from AP 110, and thereby can minimize unnecessary power consumption, congestion in the wireless network, while also increasing availability/throughput.

7. Wireless Device

Figure 7:
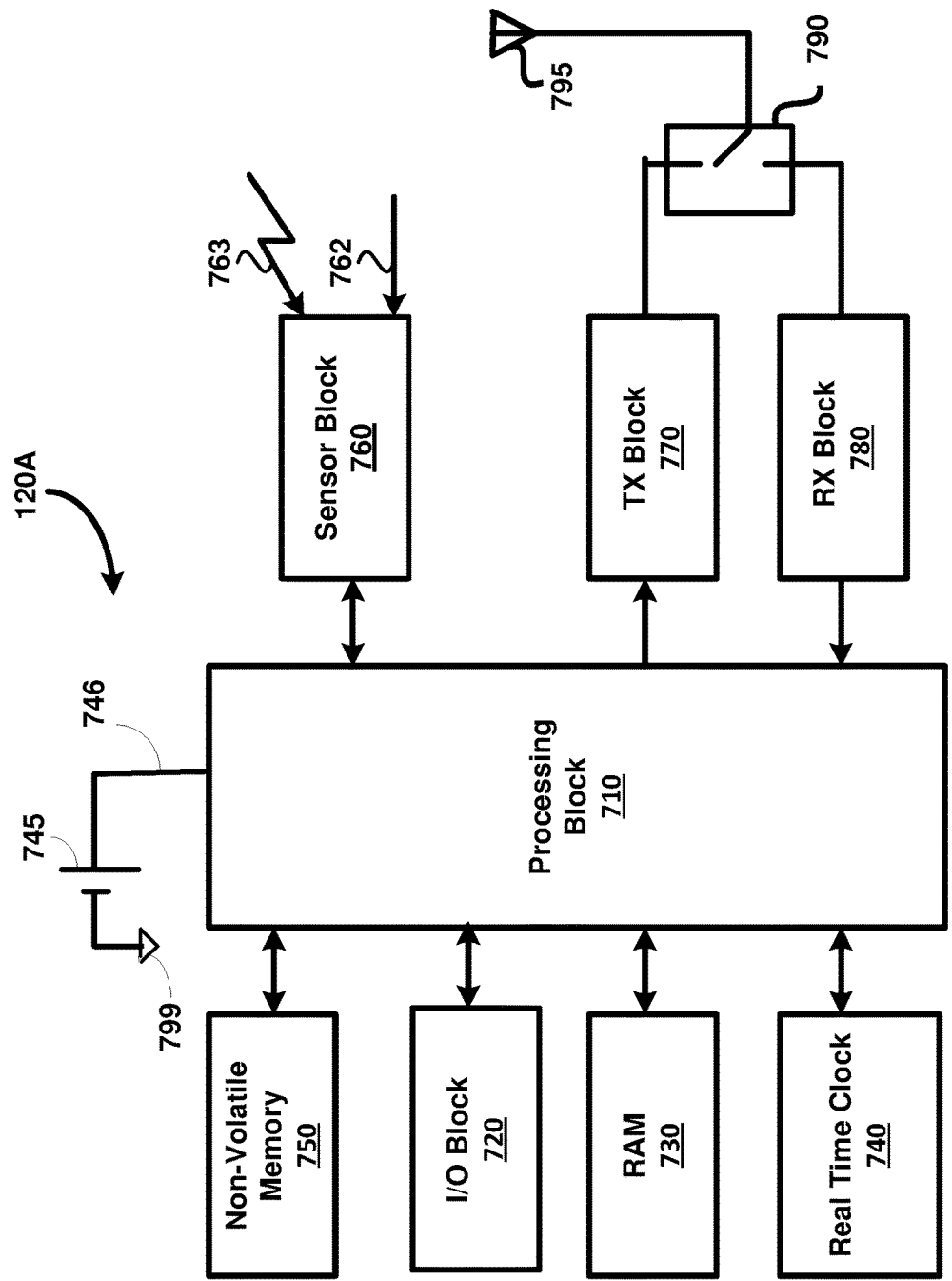
FIG. 7 is a block diagram showing the implementation details of a STA in an embodiment of the present disclosure.

FIG. 7 is a block diagram showing the implementation details of a STA in an embodiment of the present disclosure. STA 120A is shown containing processing block 710, input/output (I/O) block 720, random access memory (RAM) 730, real-time clock (RTC) 740, battery 745, non-volatile memory 750, sensor block 760, transmit (TX) block 770, receive (RX) block 780, switch 790, and antenna 795. The whole of STA 120 may be implemented as a system-on-chip (SoC), except for battery 745 and antenna 795. Alternatively, the blocks of FIG. 7 may be implemented on separate integrated circuits (IC). Terminal 799 represents a ground terminal. STAs 120B and 120C may also be implemented as shown in FIG. 7, and as described below.

Battery 745 provides power for operation of STA 120A, and may be connected to the various blocks shown in FIG. 7. While STA 120A is shown as being battery-powered, in another embodiment, STA 120A is mains-powered and contains corresponding components such as transformers, regulators, power filters, etc. RTC 740 operates as a clock, and provides the 'current' time to processing block 710. Additionally, RTC 740 internally contains one or more timers (such as keep-alive timer 465 of FIG. 4), which are operated as described in detail above to determine the time instants of transmission of keep-alive messages.

I/O block 720 provides interfaces for user interaction with STA 120, and includes input devices and output devices. The input devices may include a keyboard and a pointing device (e.g., touch-pad, mouse). Output devices may include a display.

Sensor block 760 may contain one or more sensors, as well as corresponding signal conditioning circuitry, and provides to processing block 710, measurements/values of physical quantities such as temperature, pressure, etc., sensed via wired path 762 or wireless path 763. Sensor block 760 may perform analog-to-digital conversion of the measurement/values prior to forwarding the measurements/values to processing block 710. Application layer 410 (of FIG. 4) may further process the (digitized) measurements/values and form frames containing such values.

Antenna 795, corresponds to antenna 125 of FIGS. 1 and 4, and operates to receive from, and transmit to, a wireless medium, corresponding wireless signals representing frames/keep-alive messages (e.g., according to IEEE 802.11 (WLAN) standards). Switch 790 may be controlled by processing block 710 (connection not shown) to connect antenna 795 to one of blocks 770 and 780 as desired, depending on whether transmission or reception of wireless signals is required. Switch 790, antenna 795 and the corresponding connections of FIG. 7 are shown merely by way of illustration. Instead of a single antenna 795, separate antennas, one for transmission and another for reception of wireless signals, can also be used. Various other techniques, well known in the relevant arts, can also be used instead.

TX block 770 receives, from processing block 710, frames/keep-alive messages to be transmitted on a wireless medium (e.g., according to a wireless standard such as IEEE 802.11), generates a modulated radio frequency (RF) signal (according to the standard), and transmits the RF signal via switch 790 and antenna 795. TX block 770 may contain RF and baseband circuitry (corresponding to physical layer 450 of FIG. 4) for generating and transmitting wireless signals, as well as for medium access operations (corresponding to data link layer 440). Alternatively, TX block 770 may contain only the RF circuitry, with processing block 710 performing the baseband and medium access operations (in conjunction with the RF circuitry).

RX block 780 represents a receiver that receives a wireless (RF) signal (e.g., according to IEEE 802.11) bearing data and/or control information (including de-authentication frames transmitted by AP 110) via switch 790, and antenna 795, demodulates the RF signal, and provides the extracted data or control information to processing block 710. RX block 780 may contain RF as well as baseband processing circuitry for processing a WLAN signal. Alternatively, RX block 780 may contain only the RF circuitry, with processing block 710 performing the baseband operations in conjunction with the RF circuitry.

Non-volatile memory 750 is a non-transitory machine readable medium, and stores instructions, which when executed by processing block 710, causes STA 120A to operate as described above. In particular, the instructions enable STA 120A to operate as described with respect to the flowchart of FIG. 2. Further, nonvolatile memory 750 may store instructions corresponding to applications in application layer 410, keep-alive module 460, network layer 420 and at least some portions of data link layer 440. The instructions may either be executed directly from non-volatile memory 750 or be copied to RAM 730 for execution.

RAM 730 is a volatile random access memory, and may be used for storing instructions and data.

RAM 730 and non-volatile memory 750 (which may be implemented in the form of read-only memory/ROM/Flash) constitute computer program products or machine (or computer) readable medium, which are means for providing instructions to processing block 710. Processing block 710 may retrieve the instructions, and execute the instructions to provide several features of the present disclosure.

Processing block 710 (or processor in general) may contain multiple processing units internally, with each processing unit potentially being designed for a specific task. Alternatively, processing block 710 may contain only a single general-purpose processing unit. Processing block 710 executes instructions stored in non-volatile memory 750 or RAM 730 to enable STA 120A to operate according to several aspects of the present disclosure, described above in detail.

8. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method performed in a wireless station (STA) of a wireless network, said method comprising:
    receiving a de-authentication frame from an access point (AP) of said wireless network, said de-authentication frame indicating that said AP has disassociated said STA due to inactivity;
    determining a keep-alive interval based on one or more de-authenticated messages received from said AP, said one or more de-authenticated messages including said deauthentication frame;
    transmitting keep-alive messages according to the determined keep-alive interval;
    transmitting a first frame to said AP, wherein said STA is associated with said AP before transmission of said first frame, wherein said de-authentication frame is a response from said AP to said first frame, wherein said first frame is transmitted at a first time instant (T1);
    initializing an expected inactivity time to a first value, wherein said expected inactivity time represents an estimate of an inactivity time maintained by said AP, wherein said AP disassociates said STA if a frame is received after elapse of said inactivity time from an immediately previous frame transmitted by said STA to said AP;
    identifying that a second frame has been transmitted immediately prior to said first frame at a prior time instant (T2);
    adjusting the value of said expected inactivity time based on the values of said T1 and said T2; and
    re-associating with said AP.

2. The method of claim 1, further comprising:
    computing a difference of T1 and T2; and
    if said difference is less than said first value of said expected inactivity time, then setting said expected inactivity time to a value equal to said difference.

3. The method of claim 2, further comprising:
    repeating transmitting a next frame as said first frame, said identifying, said computing, said setting and said re-associating for another pair of successive frames, and updating the value of said expected inactivity time, wherein said another pair comprises an immediately preceding frame to said next frame, and said next frame which causes a corresponding de-authentication frame to be received.

4. The method of claim 3, wherein said repeating is performed until a stop criterion is reached, wherein the value of said expected inactivity time when said stop criterion is reached is used thereafter to transmit said keep-alive messages.

5. The method of claim 4, further comprising increasing the value of said expected inactivity time if no de-authentication frame is received from said AP in response to said next frame.

6. The method of claim 1, wherein said initializing further comprises, upon transmission of said second frame, setting a timer to expire after a time interval equal to said first value of said expected inactivity time,
    wherein said transmitting a first frame transmits a first keep-alive message as said first frame upon expiry of said timer at T1,
    wherein said adjusting reduces said first value to a second value equal to half of said first value.

7. The method of claim 6, further comprising:
    transmitting a third frame;
    setting said timer, upon transmission of said third frame, to expire after a time interval equal to said second value of said expected inactivity time;
    transmitting a second keep-alive message upon expiry of said timer; and
    if a de-authentication frame is received in response to said second keep-alive message, then:
        reducing said second value to a third value equal to half of said second value, and
        re-associating with said AP,
    but if no de-authentication frame is received in response to a next keep-alive message, then:
        setting said timer to a value midway between said first value and said second value, and
        transmitting a third keep-alive message upon expiry of said timer.

8. The method of claim 7, wherein determination of said expected inactivity time is made according to binary successive approximation approach.

9. The method of claim 1, wherein said de-authentication frame contains the inactivity time used by said AP in an information element (IE) field, wherein said AP disassociates said STA if a frame is received after elapse of said inactivity time from an immediately previous frame transmitted by said STA to said AP, said method further comprising:
    examining said IE field of said de-authentication frame to determine the value of said inactivity time,
    wherein said determining determines said keep-alive interval as being equal to said inactivity time.

10. A non-transitory machine readable medium storing one or more sequences of instructions for operating a wireless station (STA) of a wireless network, wherein execution of said one or more instructions by one or more processors contained in said STA enables said STA to perform the actions of:
    receiving a de-authentication frame from an access point (AP) of said wireless network, said de-authentication frame indicating that said AP has disassociated said STA due to inactivity;
    determining a keep-alive interval based on one or more de-authenticated messages received from said AP, said one or more de-authenticated messages including said deauthentication frame;
    transmitting keep-alive messages according to the determined keep-alive interval;
    transmitting a first frame to said AP, wherein said STA is associated with said AP before transmission of said first frame, wherein said de-authentication frame is a response from said AP to said first frame, wherein said first frame is transmitted at a first time instant (T1);
    initializing an expected inactivity time to a first value, wherein said expected inactivity time represents an estimate of an inactivity time maintained by said AP, wherein said AP disassociates said STA if a frame is received after elapse of said inactivity time from an immediately previous frame transmitted by said STA to said AP;

identifying that a second frame has been transmitted immediately prior to said first frame at a prior time instant (T2);

adjusting the value of said expected inactivity time based on the values of said T1 and said T2; and re-associating with said AP.

11. The non-transitory machine readable medium of claim 10, further comprising instructions for enabling said STA to perform the actions of:

computing a difference of T1 and T2; and if said difference is less than said first value of said expected inactivity time, then setting said expected inactivity time to a value equal to said difference.

12. The non-transitory machine readable medium of claim 11, further comprising instructions for enabling said STA to perform the actions of:

repeating transmitting a next frame as said first frame, said identifying, said computing, said setting and said re-associating for another pair of successive frames, and updating the value of said expected inactivity time, wherein said another pair comprises an immediately preceding frame to said next frame, and said next frame which causes a corresponding de-authentication frame to be received.

13. The non-transitory machine readable medium of claim 10, wherein said initializing further comprises, upon transmission of said second frame, setting a timer to expire after a time interval equal to said first value of said expected inactivity time, wherein said transmitting a first frame transmits a first keep-alive message as said first frame upon expiry of said timer at T1, wherein said adjusting reduces said first value to a second value equal to half of said first value.

14. A wireless station (STA) of a wireless network, said STA comprising:

a processor block and a memory, said memory to store instructions which when retrieved and executed by said processor block causes said STA to perform the actions of:

receiving a de-authentication frame from an access point (AP) of said wireless network, said de-authentication frame indicating that said AP has disassociated said STA due to inactivity;

determining a keep-alive interval based on one or more de-authenticated messages received from said AP, said one or more de-authenticated messages including said de-authentication frame;

transmitting keep-alive messages according to the determined keep-alive interval;

transmitting a first frame to said AP, wherein said STA is associated with said AP before transmission of said first frame, wherein said de-authentication frame is a response from said AP to said first frame, wherein said first frame is transmitted at a first time instant (T1);

initializing an expected inactivity time to a first value, wherein said expected inactivity time represents an estimate of an inactivity time maintained by said AP, wherein said AP disassociates said STA if a frame is received after elapse of said inactivity time from an immediately previous frame transmitted by said STA to said AP;

identifying that a second frame has been transmitted immediately prior to said first frame at a prior time instant (T2);

adjusting the value of said expected inactivity time based on the values of said T1 and said T2; and re-associating with said AP.

15. The STA of claim 14, wherein said initializing further comprises, upon transmission of said second frame, setting a timer to expire after a time interval equal to said first value of said expected inactivity time, wherein said transmitting a first frame transmits a first keep-alive message as said first frame upon expiry of said timer at T1, wherein said adjusting reduces said first value to a second value equal to half of said first value.

16. The STA of claim 15, wherein said instructions further cause said STA to perform the actions of:

transmitting a third frame;

setting said timer, upon transmission of said third frame, to expire after a time interval equal to said second value of said expected inactivity time;

transmitting a second keep-alive message upon expiry of said timer; and if a de-authentication frame is received in response to said second keep-alive message, then:

reducing said second value to a third value equal to half of said second value, and re-associating with said AP, but if no de-authentication frame is received in response to a next keep-alive message, then;

setting said timer to a value midway between said first value and said second value, and transmitting a third keep-alive message upon expiry of said timer.

17. The STA of claim 14, wherein said de-authentication frame contains the inactivity time used by said AP in an information element (IE) field, wherein said AP disassociates said STA if a frame is received after elapse of said inactivity time from an immediately previous frame transmitted by said STA to said AP, said method further comprising:

examining said IE field of said de-authentication frame to determine the value of said inactivity time, wherein said determining determines said keep-alive interval as being equal to said inactivity time.

* * * * *